United States Patent [19]

Stevens

[11] Patent Number: 4,784,520

[45] Date of Patent: Nov. 15, 1988

[54] SHORELINE PROTECTING SYSTEM AND APPARATUS

[76] Inventor: C. Leigh Stevens, 3922 Norton Hills Rd., Muskegon, Mich. 49441

[21] Appl. No.: 936,513

[22] Filed: Dec. 1, 1986

[51] Int. Cl.⁴ .............................................. E02B 3/00
[52] U.S. Cl. ....................................... 405/21; 405/15; 405/30; 405/107
[58] Field of Search .................... 405/15–19, 405/30–34, 107, 108, 115

[56] References Cited

U.S. PATENT DOCUMENTS

| | | | |
|---|---|---|---|
| 231,957 | 9/1880 | Dyer | 405/34 X |
| 1,175,962 | 3/1916 | Latham | 405/31 |
| 1,230,608 | 6/1917 | Sheldon | 405/32 |
| 2,641,221 | 6/1953 | Sibinski et al. | |
| 3,280,569 | 10/1966 | Wosenitz | 405/34 |
| 3,342,033 | 9/1967 | Crouch et al. | |
| 3,415,061 | 12/1968 | Staempfli | 405/31 X |
| 3,465,530 | 9/1969 | Renfro | |
| 3,643,440 | 2/1972 | Knisse | |
| 3,886,751 | 6/1975 | Jimenez/Labora | 405/15 X |
| 3,957,098 | 5/1976 | Hepworth et al. | 405/17 X |
| 4,129,006 | 12/1978 | Payne | 405/31 |

FOREIGN PATENT DOCUMENTS 977338  12/1964  United Kingdom .................. 405/35

Primary Examiner—Dennis L. Taylor
Attorney, Agent, or Firm—Fleit, Jacobson, Cohn & Price

[57] ABSTRACT

A system and apparatus for protecting a shoreline from erosion, damage, flooding and the like from fluctuations in the water level in various bodies of water such as lakes, rivers, oceans and the like and for quickly and efficiently closing a breach in a levee, dam or other water containment barrier and includes a series of watertight, hollow fabricated structures that can be quickly filled with various materials for retaining the hollow structures in a desired position. The hollow structures are relatively lightweight and can be easily transported to a use site by various transportation modes. The system and apparatus also includes a mat closure device to close gaps between adjacent ends of the hollow structures to provide a continuous barrier. Each of the structures are generally triangular in cross-sectional configuration having top and back corner edges formed as a radius and the front corner facing the water being formed as an acute angle to minimize cavitation and undermining due to wave action, current action or the like. The system and apparatus also has utility in building highway bridges by enabling relatively simplified highway bridge abutment structures to be formed.

10 Claims, 3 Drawing Sheets

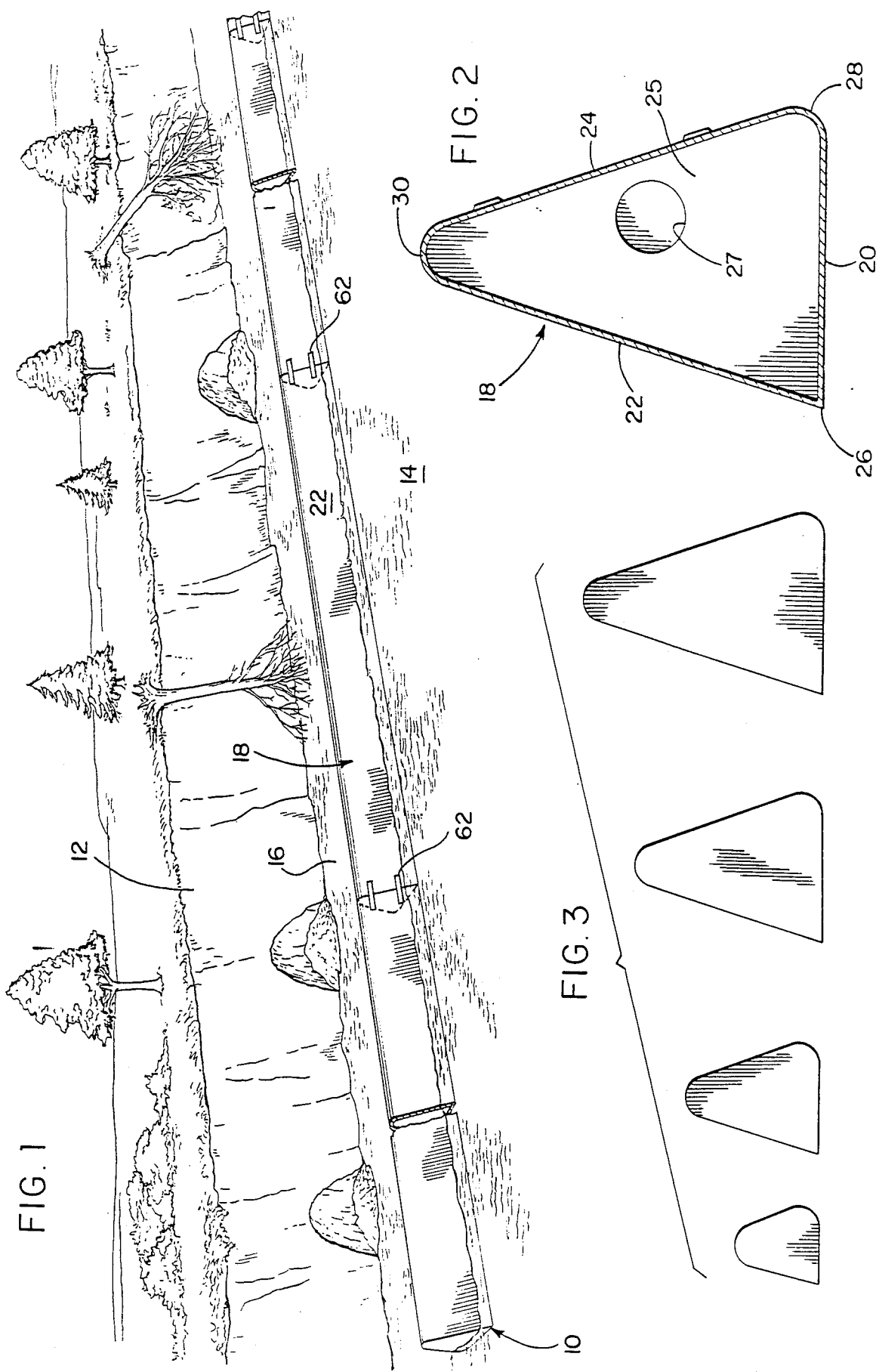

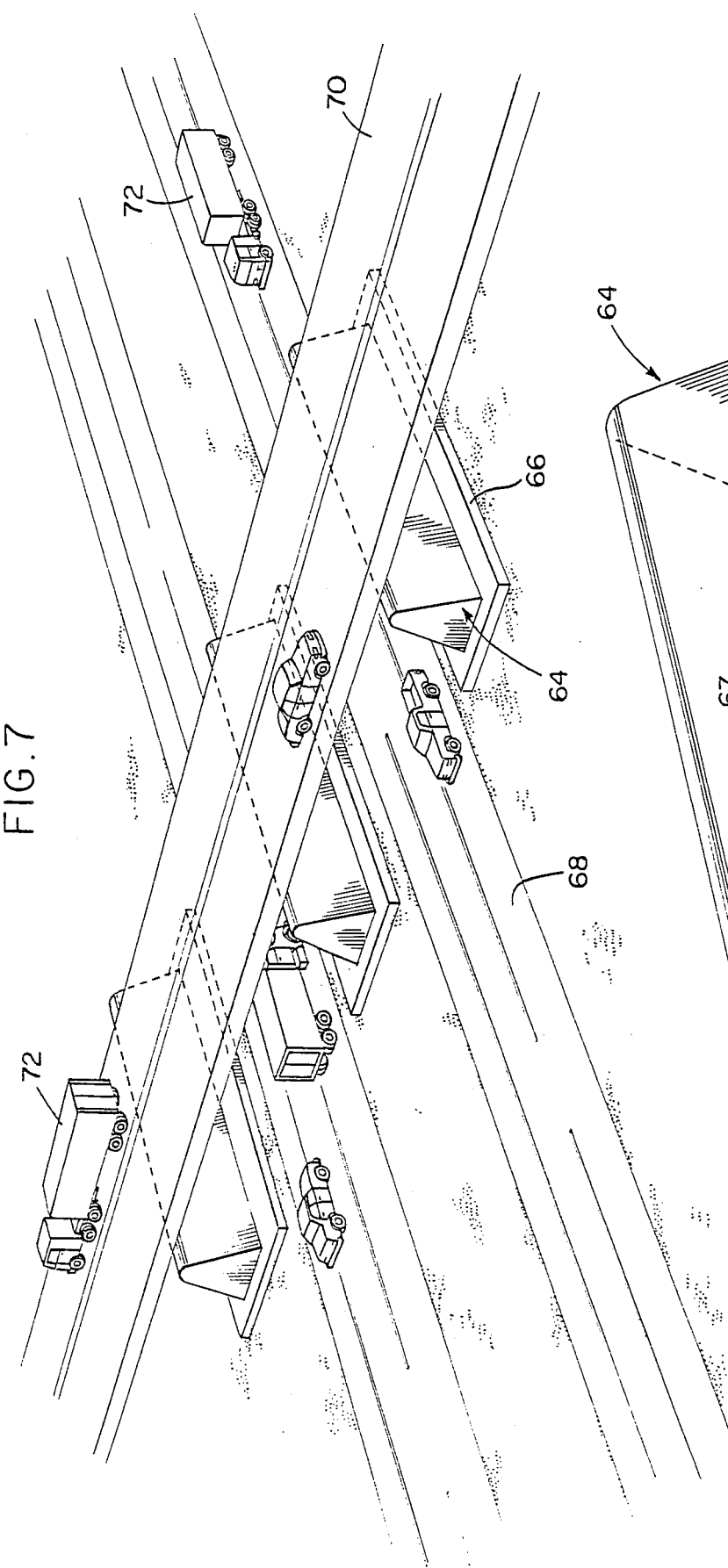
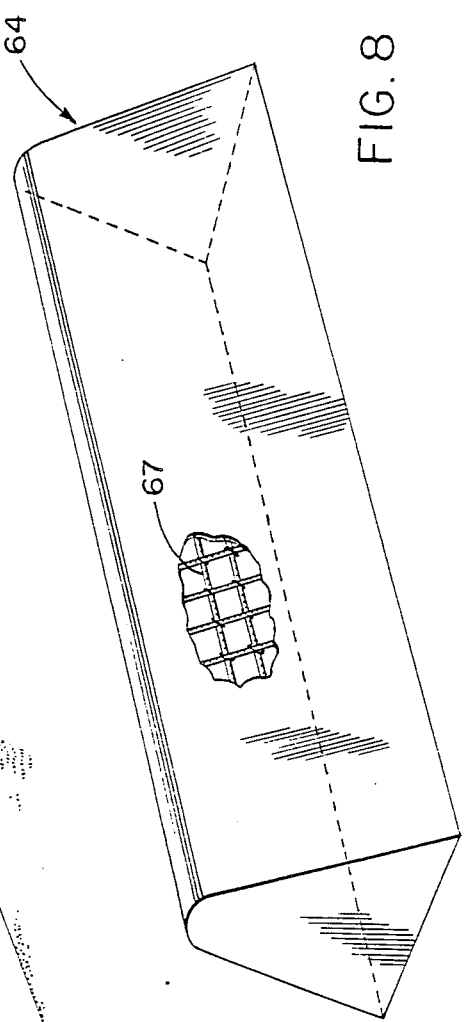

SHORELINE PROTECTING SYSTEM AND APPARATUS

BACKGROUND OF THE INVENTION

Field of the Invention

The present invention generally relates to a system and apparatus for protecting a shoreline from erosion, flooding and the like from fluctuations in the water level in various bodies of water such as lakes, rivers, oceans and the like. The invention also generally relates to a system and apparatus for quickly and efficiently closing a breach in a levee, dam or other water containment barrier. The system and apparatus of the present invention includes a series of watertight, hollow fabricated structures that can be quickly filled with various materials for retaining the hollow structures in a desired position. The hollow structures are relatively lightweight and can be easily transported to a use site by various modes of transportation including over the road, floating into position, airborne into position and manually oriented into final relationship to the shoreline being protected or levee break being plugged or closed. The system and apparatus also includes a mat closure device to close gaps between adjacent ends of the hollow structures and between the hollow structures and a levee and/or seawall to provide a continuous barrier. Each of the structures are generally triangular in cross-sectional configuration having top and back corner edges formed as a radius and the front corner, facing the water being formed as an acute angle to minimize cavitation and undermining due to wave action, current action or the like. In addition to use in shoreline protection or levee break closure, the system and apparatus also has utility in building highway bridges by enabling relatively simplified highway bridge abutment structures to be formed.

Information Disclosure Statement

Seawalls and other water containment structures built up from individual stackable units are generally known as are similar structures made from stacked and interconnected blocks and the like. However, the known prior art does not include the system or apparatus of this invention. The known prior art will be submitted and discussed in a separate information disclosure statement.

SUMMARY OF THE INVENTION

An object of the invention is provide a system and apparatus for protecting shorelines along the edges of various bodies of water, close breaks in a water containment levee, dam or the like which includes a plurality of hollow prefabricated structures which can be easily and quickly transported to a use site, placed in desired position and filled with a material that will retain the hollow structures in position after installation with such filler being water, a water-sand slurry, grout or concrete depending upon the desire for a permanent or temporary solution to the condition being alleviated.

Another object of the invention is to provide a system and apparatus in accordance with the preceding object in which the hollow structures are generally of triangular cross-sectional configuration and modular in size to enable the system and apparatus to be adapted for use in various installational environments.

A further object of the invention is to provide a system and apparatus as set forth in the preceding objects in which the cross-sectional configuration of the structures is generally in the form of an isosceles triangle having an acute angle bottom corner facing the water and a rounded bottom corner away from the water with the acute angle corner preventing cavitation or undermining by wave action, water currents and the like and the rounded corner enabling the hollow structure to be more easily skidded into position with the dimensional characteristics of the structures being varied but having maximum length, height and width to enable over the road transport as well as airborne transport and transport by floating the structures in a body of water to a desired position on or adjacent the shoreline or levee break to be protected or closed.

Still another object of the invention is to provide a system and apparatus in which the hollow structures can be used in constructing bridge supporting abutments in a simplified manner as compared to present structural techniques used in construction of bridge supporting abutments.

A still further object of the invention is to provide a system and apparatus which is effective in use, simple in operation and maintenance, easy to use and effective in solving various problems relating to water level fluctuations along a shoreline, breaks in a water levee, earthen dam or other water containment structure or water barrier structure.

These together with other objects and advantages which will become subsequently apparent reside in the details of construction and operation as more fully hereinafter described and claimed, reference being had to the accompanying drawings forming a part hereof, wherein like numerals refer to like parts throughout

BRIEF DESCRIPTION OF THE DRAWINGS

FIG. 1 a perspective view illustrating the system and apparatus of the present invention installed along a shoreline for protecting the shoreline from erosion or other damage FIG. 2 transverse, sectional view of one of the hollow fabricated structures.

FIG. 3 illustrates end views of a plurality of hollow structures of different sizes and shapes.

FIG. 7 is a perspective view illustrating the use of this invention in forming highway bridge supporting abutments.

FIG. 8 is a perspective view of one of the hollow fabricated structures.

DESCRIPTION OF THE PREFERRED EMBODIMENTS

Figure 4:
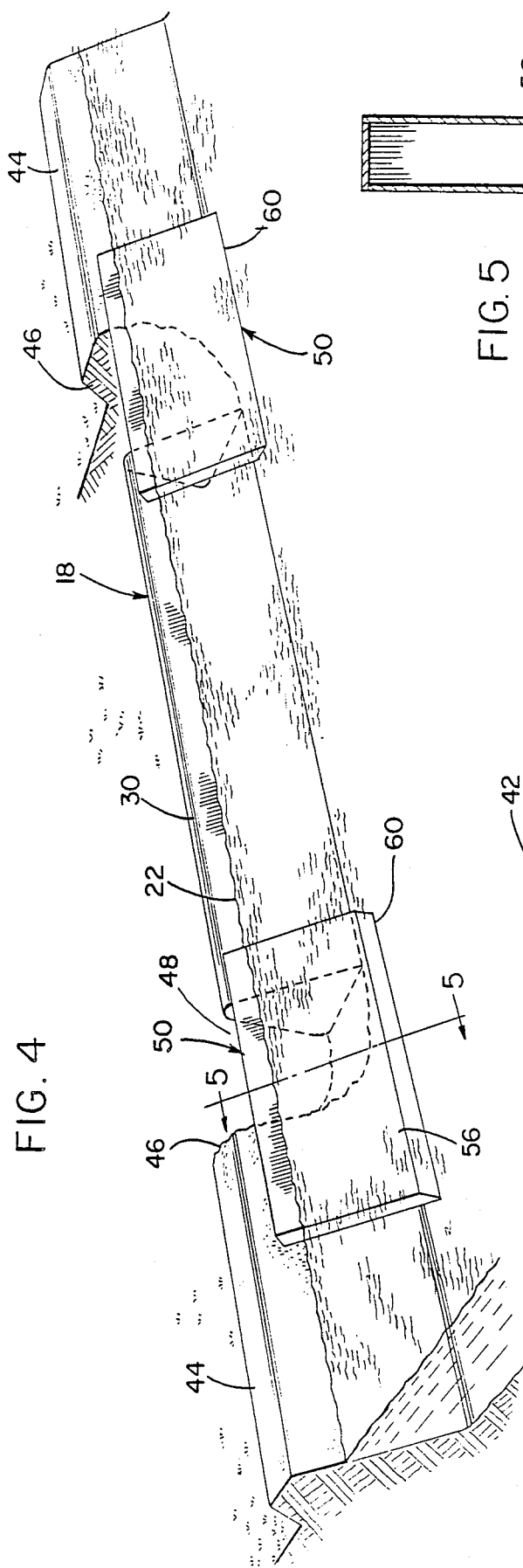
FIG. 4 is a perspective view illustrating a use of the present invention in closing a break in a levee or other water containment barrier.

FIG. 1 illustrates the shoreline protection system and apparatus of the present invention generally designated by numeral 10 which is oriented adjacent a shoreline 12 subject to erosion due to water level fluctuation, high water, wave action and the like from water 14 in a lake, river, ocean or other body of water with the system and apparatus of the present invention resting on the lake bottom, river bottom or the bottom of any other body of water which forms a continuation of a beach area 16. As illustrated, the apparatus of the invention includes a plurality of elongated hollow prefabricated structures 18 oriented generally in lengthwise alignment in end-to-end relation to form a continuous shoreline protector with the total length of the system being variable and with the structures 18 being constructed in incremental or modular sizes to enable flexibility in installation and use.

As illustrated in FIG. 3, each structure 18 is of generally triangular cross-sectional configuration with the triangular configuration generally being in the form of an isosceles triangle including a bottom wall 20, a front wall 22 and a rear or back wall 24 with the front wall 22 being the wall which faces the water 14. The corner forming the juncture between the bottom wall 20 and the front wall 22 is of acute angular configuration as designated at 26. The corner at the back of the structure 18 which joins the bottom wall 20 and back wall 24 is radiused as at 28 and the top corner 30 joining the walls 22 and 24 also is radiused or rounded with the radiused or rounded corners facilitating skidding of the structure 18 along a supporting surface with the radiused corners being tangential to the bottom of the end walls so that the unit can be easily skidded along the ground surface, beach surface or the like and may be skidded onto the lake or river shore from the waterside of the body of water when the structure is floated into position. Also, the radius on the bottom back edge 28 allows sandbags, clay, dirt or other similar material to be packed tightly against the body to minimize leakage and undermining when the unit is used as a levee, levee break closure or shoreline protection. The front bottom corner or edge 26 utilizes an acute angle in order to minimize cavitation and undermining from wave action or water current action. Also, the radiused top edge 30 provides a safety arrangement when used as a seawall or levee. The isosceles triangle shape of the structure has several advantages. When it is used as a seawall, the force of the waves is dissipated by the sloping surface compared as to a vertical surface. When heavy waves hit the sloping surface, solids suspended in the water will wash over the top of the wall and be deposited on the back side thus building up the beach 16 while the water will soak through the ground and flow through the ground into the body of water thereby providing a rearward beach enhancement which can be valuable along sandy beaches.

Each of the structure 18 is watertight and is incrementally or modular sized so it can be prefabricated in the shop and easily transported by truck, rail, barge, air transport and can be floated into position. Lengths of the structures 18 can vary but ideally will be limited to maximum length to enable over the highway transport without special permits being obtained. When constructing the prefabricated structures, they should be tested for watertightness and after installation, the structures are filled with non-buoyant material through a coupling 32 welded or otherwise secured to the exterior of the structure, preferably to the top edge 30 or front wall 22. There must always be at least two couplings 32 spaced remotely from each other on the top edge or front wall so that as one coupling is being used to fill the structure or as a suction coupling when removing material, the other coupling acts as a vent to prevent over pressurization or vacuum collapse.

Figure 6:
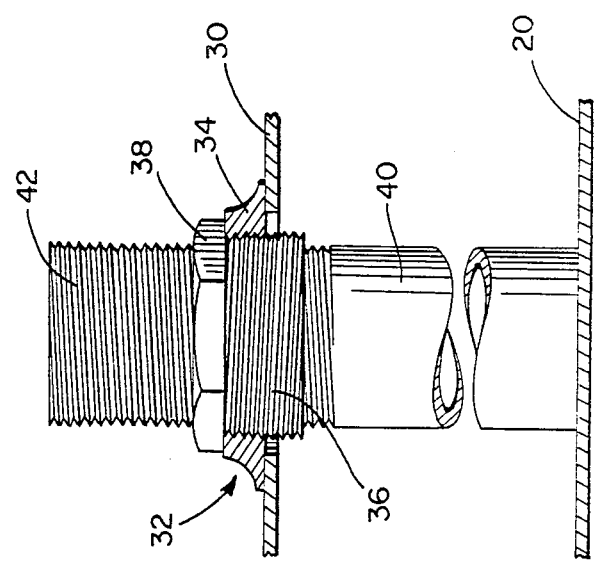
FIG. 6 is a sectional view illustrating a structure facilitating filling and removal of material in relation to the hollow structure.

FIG. 6 illustrates the structure of the fill or suction coupling 32 which includes an internally threaded pipe fitting 34 welded or otherwise secured to the top edge 30 and a threaded bushing 36 is positioned in the fitting 34 and provided with a polygonal outer end 38. This enables a closure cap to be provided in the form of an externally or internally threaded plug. When a removable liquid is used to fill the tank, a suction pipe 40 having a threaded upper end portion is inserted through the bushing 36 in screw threaded relation so that the bottom end of suctional pipe 40 is positioned adjacent to the bottom wall 20 of the structure 18. Then the non-buoyant filler material can be removed through the suction pipe when desired in the event that shoreline protection is no longer needed. The structures can then be emptied and easily moved to a new position or to a convenient storage area.

When convenient shoreline access is not available, the structures can be floated into place, winched onto the shore or sunk in shallow water. In levee break situations, as illustrated in FIG. 4 in which the levee 44, earthen dam or other water containment barrier is breeched with the break being designated by numeral 46, one or more structures 18 can be joined together, floated into position or lowered into position by a crane or the like so that it extends across the break 46 in the levee 44. If desired, the isosceles triangular shape enables multiple structural units to be sunk in parallel position and other identical triangular unit inverted and positioned into the V-shaped space between the parallel initially positioned structural units and, if necessary, additional layer or layers may be added to the top of the structure in a like manner to add height.

Figure 5:
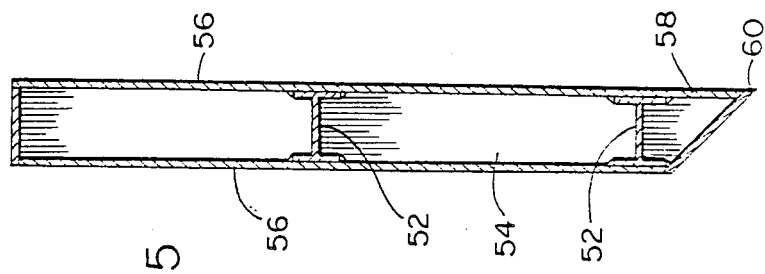
FIG. 5 is a sectional view of one of the mats taken substantially upon a plane passing along section line 5—5 on FIG. 4.

As illustrated in FIGS. 4 and 5, where it is desired to close a gap 48 between the end of a unit 18 and a levee 44 or between adjacent structural units 18, a mat closure device 50 may be provided which can be lowered to close the gaps 48 by positioning them so that they rest against the surfaces of the units 18 facing the water or resting against the end surface of one of the units 18 and adjacent levee surface. The mat closures may also be used to close undermined gaps between the bottom of the structural units and the bottom of the body of water with these units being of various lengths and widths and consisting of a plurality of horizontally disposed steel beams 52 as well as vertical beams 54 having closure plates or face plates 56 on both surfaces thereof which are welded or otherwise secured to the beams with the lower edge of the mat including a depending right triangular bevelled end portion 58 which forms a cutting edge 60 of acute angular configuration on the bottom in order to help penetrate the bed of the water body when they are lowered into position with the mat being non-buoyant and easily sunk into position. A suitable structure may be provided on the upper edge thereof for receiving lifting hooks or other structure to enable the mat closure devices to be easily handled.

The hollow construction allows the flat plate areas to be stiffened against wave, debris or ice action while retaining strength and watertight integrity. Bulkheads 25 in the hollow structures are provided with holes 27 for flow through of material and to permit worker access during construction and also somewhat lighten the units for shipments. The holes in spaced bulkheads are preferably offset so that surging of fluids inside the units is minimized and larger units have additional stiffeners to strengthen unsupported plate areas against outside impact. It is pointed out that the sizes, angles, radiuses and the like are variable for different circumstances and provides either temporary or permanent solutions to flooding conditions or the like. The structural units can be stockpiled for rapid installation and just as rapidly removed when an emergency situation has passed with the units being returned to storage. In sand beach protection areas, the unit can be left in place and due to the triangular construction, the units will eventually be buried in the sand after the water level goes down and yet will have protection potential during the next high water cycle. In levee break situations, the structural units can be filled with grouting, concrete or the like and incorporated into the final permanent repair. When used for earthen dam repair, the units can be used as a permanent repair or as a temporary repair. If the dam is leaking, the units can be temporarily put in place to hold back the impounded water until permanent repairs are effected with the units then being emptied, floated and removed. When used in the event of flash floods or potential earthen dam overflowing or if spillway capacity is not sufficient to handle excess water, the units can be used to heighten the dam until the spillways and normal dam gates have sufficient discharge capacity to lower the level of the impounded water to a safe level thus avoiding the possibility of a catastrophic dam failure.

In some installations, a ladder may be attached to the exterior of the units 18 so that people normally using the beach can climb over the units if desired.

In actual construction, the vertical height of a unit 18 may range between three feet and twelve feet although smaller or larger units can be made. The maximum width at the bottom of the unit range from slightly less than three feet to approximately nine feet although this dimension may also vary with the radiused corners preferably being approximately a nine inch radius. The walls of the unit are preferably ¼ inch steel plate although the larger units may be slightly thicker. The end plates and intermediate bulkhead plates may be welded in place with the bulkhead plates having large openings therein with all welds being conventional in and of themselves. The holes may have a diameter of 18 to 20 inches and are preferably offset where possible. The angles of the front and rear walls may be the same at approximately 71° to horizontal although this also may vary. FIG. 3 illustrates variations in the unit sizes and shapes with the general isosceles configuration being retained. Various optional arrangements may be provided including lifting lugs mounted on top of the units and hold down lugs may be welded at the front and rear lower corners for receiving anchor bolts. Tank filling devices may be provided at opposite ends of the units and at the top or at the bottom of either of the walls. A through drain may be provided from front to rear and a vertical passageway may be provided for receiving a piling or other anchoring device if desired with the watertight integrity being maintained. The inlet and drain couplings may be standard 2 inch pipe fittings, plugs and the like with standard metal working procedures, welding procedures and the like being utilized to secure the components in assembled relation.

The mat closure device may be constructed in various sizes including a length of 20 to 30 feet, more or less, and a depth or thickness of approximately 12 inches and a height commensurate with the height required. Various types of adapters may be utilized to enable the adjacent units to be oriented in angular relation to each other. The adjacent ends of the units where they abut in either straight line or in angled condition may be connected by tie straps as at 62 in FIG. 1 welded to the adjacent units.

The system and apparatus of the present invention also can be used in building simple beam highway bridges to serve as supporting abutments as illustrated in FIGS. 7 and 8 and designated by reference numeral 64. This system can be used in different ways depending upon the bearing strength of the soils encountered. Where the soils are sufficiently strong, the site can be level and the units 64 put in place and filled with concrete. Where the soils are weak or where the soils might move, a concrete pad or footing 66 is poured and allowed to hardent and cure sufficiently to accept the weight of the units 64. When using the units for highway bridge abutment construction, intermediate interior bulkheads are omitted and steel reinforcing bars 67 are placed therein according to established standards and a series of holes are formed in the uppermost surface of the units and provided with short pipes t allow trapped air to be vented and the radius at the top of the units is increased to accept a prefabricated structure corresponding to standard bridge abutment cap plates.

As illustrated in FIG. 7, the pad or footing 66 is positioned alongside of a roadway 68 and the units 64 support an overlying bridge and roadway 70 so that vehicles 72 may move along the roadways in a conventional manner. By using these units for simple bridge systems, the bridge abutments or supports can be put in place and the concrete poured in a very short time as compared to present techniques in forming concrete bridge abutments. In poor soil or earthquake prone area, a slip joint is provided at the base of the bridge support which does not weaken the bridge but enables the bridge to survive ground movement thus saving its structure. The large radius at the top of the unit which forms a form for the concrete allows a matching bridge beam seat to be easily placed on top of the support structure so that in the event of an earthquate, the bridge seat can rotate in the event the ground rises on one side of the bridge and not the other so that, in effect, the units of the present invention allow motion in any horizontal or vertical plane within reasonable limits without destroying the integrity of the bridge itself thereby providing a safeguard for bridges in earthquake prone zones.

The bridge or seawall units can be easily and quickly installed in mud slide areas to impede the flow of mud onto highways and can be used as temporary dams across ravines to impound rapid run-off water to protect downstream areas from damage due to rapid movement of such water as sometimes occurs in flash flood areas.

The foregoing is considered as illustrative only of the principles of the invention. Further, since numerous modifications and changes will readily occur to those skilled in the art, it is not desired to limit the invention to the exact construction and operation shown and described, and accordingly, all suitable modification and equivalents may be resorted to, failing within the scope of the invention.

What is claimed as new is as follows:

1. An apparatus for protecting the shoreline of a body of water, closing a breach in a levee and the like comprising a plurality of rigid hollow structural units of generally triangular cross-sectional configuration for positioning a single unit or multiple units in an end-to-end relation along a shoreline or in a levee break, each of said units, being watertight and buoyant, means on each unit to enable non-buoyant material to be placed in the unit after it has been positioned in desired orientation for retaining the unit in place to form a barrier to water flow beyond the unit or units.

2. The apparatus as defined in claim 2 wherein the cross-sectional configuration of each unit is generally that of an isosceles triangle having an acute angular lower corner facing the water to prevent cavitation and undermining of the unit by wave action and water current action.

3. The apparatus as defined in claim 2 wherein the other corners of the unit are radiused to enable skidding of the unit to a final position along a supporting surface, provide a rounded safe upper edge with the bottom corner remote from the water providing an area for packing sandbags or other filler material to prevent leakage past the unit.

4. The apparatus as defined in claim 3 wherein said units are interconnected by tie straps welded to adjacent units.

5. The apparatus as defined in claim 3 wherein each of the units includes end walls and longitudinally spaced intermediate baffle walls having staggered openings therein, which act as reinforcement and surge suppressors.

6. The structure as defined in claim 5 together with a closure mat for bridging a gap between a unit and the end of a levee break or the gap between adjacent units comprising a rigid framework having facing rigid plates forming a closed, generally rectangular member of non-buoyant construction, the lower edge of said member having a tapered edge for penetration into the bottom surface of a body of water to form a closure for the gap.

7. The apparatus as defined in claim 6 wherein the means providing access to the interior of the unit for filling with non-buoyant material includes a threaded pipe fitting, and a suction pipe extendible through and threaded into engagement with the pipe fitting and extending to the bottom of the unit for removal of the non-buoyant material to enable easy removal of the unit when no longer needed.

8. A system for protecting a shoreline, closing a breach in a levee or the like comprising the method of forming a barrier to passage of water by positioning one or more rigid hollow structural units in a flow path to prevent subsequent flow along that path, each of said units being of generally isosceles triangular cross-sectional configuration with an acute angle at the lower corner facing the water and a radiused lower corner remote from the water to reduce cavitation and undermining action of water against the acute angle corner and providing a skid at the radius corner for movement of the unit along a beach surface and the like and providing an area to pack sandbags or other material to prevent leakage under the units when installed and further including the step of filling the units with a non-buoyant material for retaining them in position.

9. The system as defined in claim 8 wherein the units are lightened by installing a suction pipe into each unit and removing the non-buoyant material therefrom or draining non-buoyant material through drain fittings.

10. The system as defined in claim 8 in which gaps between the units and adjacent surfaces are closed by a mat in the form of a rigid plate structure having a tapered lower edge for positioning against the surface of the unit facing the water with the tapered lower edge penetrating into the bottom of the body of water thereby closing any gap existing between the unit and adjacent surface.

* * * * *